(12) United States Patent
Feuz et al.

(10) Patent No.: US 11,157,488 B2
(45) Date of Patent: Oct. 26, 2021

(54) REINFORCEMENT LEARNING TECHNIQUES TO IMPROVE SEARCHING AND/OR TO CONSERVE COMPUTATIONAL AND NETWORK RESOURCES

(71) Applicant: Google LLC, Mountain View, CA (US)

(72) Inventors: Sandro Feuz, Zurich (CH); Thomas Deselaers, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 282 days.

(21) Appl. No.: 15/840,103

(22) Filed: Dec. 13, 2017

(65) Prior Publication Data

US 2019/0179938 A1   Jun. 13, 2019

(51) Int. Cl.
*G06F 16/242* (2019.01)
*G06F 9/54* (2006.01)
*G06N 20/00* (2019.01)
*G06F 16/9535* (2019.01)

(52) U.S. Cl.
CPC .......... *G06F 16/2425* (2019.01); *G06F 9/542* (2013.01); *G06F 16/9535* (2019.01); *G06N 20/00* (2019.01)

(58) Field of Classification Search
CPC .................................................. G06F 16/2425
USPC ........................................................ 707/722
See application file for complete search history.

(56) References Cited

U.S. PATENT DOCUMENTS

| 8,095,419 | B1* | 1/2012 | Kapur | G06Q 30/0218 705/14.2 |
|---|---|---|---|---|
| 2007/0203871 | A1* | 8/2007 | Tesauro | G06N 3/006 706/53 |
| 2010/0094786 | A1* | 4/2010 | Gupta | G06N 7/005 706/12 |
| 2011/0106737 | A1* | 5/2011 | Siddalingaprabhu | G06N 20/00 706/13 |
| 2013/0080377 | A1* | 3/2013 | Newnham | G06N 20/00 706/52 |
| 2017/0255879 | A1* | 9/2017 | Chen | G06N 20/00 |
| 2017/0286860 | A1* | 10/2017 | Chen | G06N 3/08 |
| 2017/0308535 | A1* | 10/2017 | Agarwal | G06N 7/005 |
| 2018/0218080 | A1* | 8/2018 | Krishnamurthy | G06F 17/2785 |
| 2018/0329998 | A1* | 11/2018 | Thomson | G06F 16/9535 |
| 2018/0374138 | A1* | 12/2018 | Mohamed | G06N 20/00 |

\* cited by examiner

*Primary Examiner* — Pierre M Vital
*Assistant Examiner* — Andrew N Ho
(74) *Attorney, Agent, or Firm* — Middleton Reutlinger (57) ABSTRACT

Implementations are related to observing user interactions in association with searching for various files, and modifying a model and/or index based on such observations in order to improve the search process. In some implementations, a reinforcement learning model is utilized to adapt one or more search actions of the search process. Such search action(s) can include, for example, updating an index, reweighting terms in an index, modifying a search query, and/or modifying one or more ranking signal(s) utilized in raking search results. A policy of the reinforcement learning model can be utilized to generate action parameters that dictate performance of search action(s) for a search query, dependent on an observed state that is based on the search query. The policy can be iteratively updated in view of a reward function, and observed user interactions across multiple search sessions, to generate a learned policy that reduces duration of search sessions.

19 Claims, 5 Drawing Sheets

REINFORCEMENT LEARNING TECHNIQUES TO IMPROVE SEARCHING AND/OR TO CONSERVE COMPUTATIONAL AND NETWORK RESOURCES

BACKGROUND

Computers are typically tasked with accessing a variety of files for a user to interact with. Such files can include documents, web pages, images, videos, and/or any other types of files that can be embodied as digital content. In order to identify specific files, a user may employ a search engine or other search application. For example, files can be identified by a search engine in response to a search request submitted by a user, and search results corresponding to the files can be presented (e.g., audibly and/or graphically) to a user in response to the search request. However, in some situations a user may need to submit multiple different search requests in order to find a search result corresponding to a particular file that is of interest to the user. For example, the particular file may not have been identified as responsive to initial search request(s) (e.g., as a result of not being indexed by term(s) of the initial request)—or a corresponding search result could have been lowly ranked for the initial search request(s). As a result, the user is required to submit additional search requests until the particular file is identified as responsive, and a corresponding search result presented to, and recognized by, the user. This can result in significant waste of computational and/or network resources, such as network resources consumed in transmission of multiple search requests and corresponding multiple result sets, and client device resources consumed in association with the multiple search requests and corresponding multiple result sets (e.g., rendering multiple result sets), etc.

SUMMARY

Implementations set forth herein relate to systems, methods, and apparatus for improving efficiency of the searching process. Various implementations can result in a reduction in a quantity of search requests a user submits before being presented with a search result for a desired file (or other content item) and/or can result in such a search result being provided for presentation to a user more prominently. This can conserve various computational and/or network resources. For example, reducing the quantity of search requests can conserve network resources, client resources, and/or search engine server resources that would otherwise be consumed in association with a greater quantity of search requests. Also, for example, providing such a search result more prominently can reduce the likelihood of a further search being issued, can lead to less "scrolling" through search results (and/or other resource intensive user interface inputs), and/or less "screen on time" in locating such a search result among a group of search results.

In some implementations, various techniques are set forth for observing user interactions (with appropriate approval from the user) in association with searching for various files, and modifying a model and/or index based on such user interactions in order to adaptively improve the search process. For example, improving the search process can include adaptively causing search results for sought after files to be identified as responsive to various search requests for which they would otherwise not be responsive and/or to causing search results for sought after files to be provided more prominently (e.g., "higher" in a list or otherwise visually distinguished) than they would have otherwise been. In many implementations, a reinforcement learning model can be utilized in the search process, and a policy of the reinforcement learning model can be iteratively updated based on observed user interactions. The policy of the reinforcement learning model can be iteratively updated based on a reward that is determined based on observed user interactions. The reward can be determined based on a reward function that seeks to reward search sessions that result in a desired file being identified and/or that seeks to reward search sessions that conclude more quickly. Such iterative updating of the policy can provide the adaptive improvement of the search process. Moreover, in various implementations a policy can be particularized to a user, or to a group of users, leading to further tailoring of the search process to the user(s). Additionally or alternatively, in some implementations an index available to a search engine can be adapted by incorporating and/or reweighting search terms, in the index, based on observed user interactions.

A reinforcement learning model for reducing an amount of time for a user to find a particular search result, and/or otherwise increasing efficiency of the search process, can operate according to a policy that is iteratively updated in accordance with a reward function. Through updating of the policy based on the reward function, the policy can be trained to reduce a number of operations that are required for a user to reach a particular search result. The operations can be a number of search queries issued to a search interface, a number of results viewed by the user, an amount of time spent searching, and/or any other metric that can quantify an amount of effort exerted before reaching a desired search result.

In implementations described herein that utilize a reinforcement learning model, a state can be determined based on a search request. The state can be based on term(s) and/or other content of the search request, as well as optional context associated with the search request (e.g., time of day, day of the week, a type of client device from which the search request originated, a geographic region from which the search request originated). As one example, the search request can include term(s), and the state can be based on a Word2vec embedding or other embedding of the term(s), generated over a separate machine learning model. Continuing with the example, the state can also include value(s) that are based on a time of the search request and a type of client device from which the search request originated. The state is processed utilizing the current policy of the reinforcement learning model to generate corresponding action parameters for one or more search actions to be performed. The current policy is utilized to choose the best (according to current training of the policy) action parameters given the current state.

The action parameters generated utilizing the policy are for one or more search actions to be performed by a search engine in response to the search request. The search actions can include one or more actions performed by a search engine such as, for example, identification of file(s) that are responsive to a search (e.g., using a search engine index) and/or ranking of search result(s) that correspond to the responsive file(s). For example, the action parameters can dictate how the search engine ranks search results that are identified as responsive to the search request. For instance, the action parameters can dictate which ranking signals are utilized in ranking the search results and/or the respective weight(s) given to each of multiple ranking signals. Ranking signals can include, for example, file based signals (e.g., based on attributes of a file independent of the query, such as quality of a file (e.g., based on a source of the file, inbound and/or outbound links of the file, popularity of the file), selection rate of a file, etc.) and/or query centric signals (e.g., based on relationship(s) between the query and a file, such as how many term(s) of the query match term(s) indexed with the file, weight of matching term(s) for the file, etc.). Also, for example, the action parameters can additionally or alternatively dictate how the search engine identifies documents that are responsive to the search request. For instance, the action parameters can dictate how responsive documents are identified such as by causing identification of one or more additional and/or alternative term(s) to utilize in searching an index to identify responsive documents (e.g., effectively "modifying" the search query)—thereby causing one or more document(s) to be responsive to the search query that would otherwise not be responsive. Also, for instance, the action parameters can additionally and/or alternatively modify, directly or indirectly, term(s) and/or other content by which various documents are indexed—also thereby causing one or more document(s) to be responsive to the search query that would otherwise not be responsive.

This process can continue for one or more searches, until it is determined that a cessation event has occurred. The cessation event can be a "negative" cessation event (i.e., quitting the search session without identifying desired content) or a "positive" cessation event. The positive cessation event indicates that the user located desired content and can be determined based on various factors. For example, the positive cessation event can be determined based on a user clicking or otherwise selecting a search result to cause a client device to open or otherwise render corresponding content, optionally combined with the content being opened or otherwise rendered for at least a threshold amount of time. Additional and/or alternative techniques can be utilized such as determining that a user "hovers" over a search result for at least a threshold amount of time. A reward is then determined based on the cessation event, and optionally based on a quantity of searches that occurred prior to the cessation event (and subsequent to a prior cessation event). For example, the reward when a positive cessation event occurs after only a single search can be more positive than a reward when the positive cessation event occurs after four searches in a search session. Also, for example, the reward when a positive cessation event occurs after four searches in a search session can be more positive than a reward when a negative cessation event occurs. Other indications of "duration" of a search session can additionally and/or alternatively be utilized in determining the reward, such as total time of the search session, a quantity of search results selected without being rendered or opened for a threshold amount of time, etc.

The reward is then utilized to update the policy through training of the policy. For example, a high positive reward indicates that the action parameters generated based on the states seen in a search session were correct—and results in training the policy such that the policy will lead to generation of similar action parameters for similar states. On the other hand, as the reward becomes less positive it indicates less "correct" generation of action parameters based on the states—and results in training the policy such that the policy will lead to generation of different action parameters for similar states. In this manner, through multiple iterations of training, the policy is adapted to lead to generation of action parameters, based on corresponding states, where the action parameters lead to more efficient occurrence of a positive cessation event. Accordingly, through iterative training of the policy of the reinforcement learning model, search performance is improved in view of observed action(s) of user(s). Various techniques for training the policy can be utilized, such as Q-learning or other model-free reinforcement learning techniques. As described herein, in various implementations a policy can be tailored to a user or group of users, through training (full training or "fine-tuning" training) based on observed search interactions of the user(s), thereby adapting the policy to the user(s). In various implementations, the reinforcement learning model comprises a neural network model that is iteratively trained based on determined rewards. In those implementations, the policy is effectively embedded in the neural network model. More particularly, the policy is effectively embedded in the learned weights of the neural network model, where those weights are learned based on iterative training of the neural network model based on rewards determined as described herein (e.g., through backpropagation of the reward signal). Further, the neural network model accepts a state as input and processing of the state can be performed using the neural network model (based on its weights as trained through reinforcement learning based on rewards) to generate output that dictates search action parameters.

In some implementations, a policy of the reinforcement learning model can operate to reduce a number of actions before a reward state is achieved. For example, the policy can be used to modify an arrangement of documents that are provided in a series of search results in order that the desired search results will be provided with the least number of states, where each state is based on a submitted search query.

In some implementations, the policy can be used to re-weight terms in an index that is used by a search application to identify documents for presenting in response to a search query. For instance, a user can be searching for a recipe document using a term that is not currently weighted toward the recipe document. The recipe document can be entitled "Tikka Masala" but the user may be initially using the search terms "spicy" and "chicken," which can be included in the index but not directly associated with the recipe. When the user identifies the document entitled "Tikka Masala" in the search results, the initial search terms "spicy" and "chicken" can be associated with the recipe document in the index. Further, the initial search terms can be associated with weights that increase a probability that the recipe document will be provided when the initial search terms are provided in a subsequent search query.

In some implementations, the policy of the reinforcement learning model can operate to modify search queries that are provided to the search application in order to reduce a number of search queries that are provided to the search application before reaching a desired search result. Specifically, a state processed by the reinforcement learning model can correspond to at least a search query that has been most recently provided to the search application. Furthermore, the actions to be reduced can include the provisioning of search results and/or the modifying of search queries. For example, a user can be searching their images for vacation photos using an initial search query that includes the term "vacation photos." The images corresponding to the vacation photos may only be initially processed to identify objects in the images. The objects can include a beach, palm trees, and ocean, and therefore a search index corresponding to the images can include the terms "beach," "palm trees," and "ocean." However, because the initial search query included the term "vacation photos," which is not in the search index, the results provided by the search application in response to the initial search query may not include the vacation photos. Eventually, when the user identifies the vacation photos after submitting multiple search queries, the policy can operate to modify an index of search query terms to provide a correlation between the initial search query term "vacation photos" and the terms (e.g., "beach," "palm trees," and "ocean") that identify the objects in the images. In this way, the next time the user submits a search query that includes the term "vacation photos," the search application will search the images according to the additional terms "beach," "palm trees," and "ocean" in order that the vacation photos will be presented in response. In some implementations, an index that correlates the additional terms to the vacation photos can be re-weighted. In this way, when the user subsequently submits the initial search term and the additional terms are searched as a result, a probability that the vacation will be presented will increase.

In yet other implementations, a non-machine learning approach can be used for reducing an amount of time a user spends searching for a particular document. The approach can include modifying a document or document index to include supplemental search terms in order to increase a probability that a desired document will appear in response to an initial search query. For example, a user can be searching for contact information at their respective mobile device using an initial search query having the terms "math teacher." However, a contact list, or a search index associated with the contact list, may not include the terms "math" or "teacher." As a result, the user will have to subsequently submit multiple search queries to identify the appropriate contact, or scroll through their list of contacts. When the user identifies the contact corresponding to their initial search term "math teacher," the contact list or the search index can be modified to include the search term "math teacher" in correlation with the contact. In this way, the next time the user searches for contact info for their math teacher, the contact they previously identified will be presented.

In some implementations, a method implemented by one or more processors is set forth as including operations such as receiving a plurality of search requests at a search interface during a search session, and determining a corresponding state for a search request of the plurality of search requests. The operations can also include processing the corresponding state utilizing a current policy of a reinforcement learning model to generate corresponding action parameters for one or more search actions to be performed by a search engine in response to the search request. The operations can further include causing the search engine to (i) perform the one or more search actions based on the search request and the corresponding action parameters and (ii) provide search results based on performance of the one or more search actions based on the search request and the corresponding action parameters. The operations can also include detecting an occurrence of a cessation event that indicates a cessation of the search session, and determining a reward based on whether the cessation event corresponds to a search result of the search results satisfying the search request. The operations can further include generating a modified policy of the reinforcement learning model by modifying the current policy of the reinforcement learning model based on the determined reward, and subsequent to the occurrence of the cessation event and generating the modified policy: receiving a separate search request, determining a state for the separate search request, processing the state utilizing the modified policy to generate other action parameters for the one or more search actions, and causing the search engine to (i) perform the one or more search actions based on the other action parameters and the separate search request and (ii) provide separate search results based on performance of the one or more search actions based on the separate search request and the other action parameters.

The corresponding action parameters can include one or more ranking parameters that dictate how search results are to be ranked. Furthermore, the operation of causing the search engine to perform the one or more search actions based on the search request and the corresponding action parameters can include causing the search engine to rank the search results based on the corresponding action parameters. The search results can be provided based on the rank of the search results. The corresponding action parameters can include one or more retrieval parameters that dictate how files are to be identified as responsive to the search request. The operation of causing the search engine to perform the one or more search actions based on the search request and the corresponding action parameters can include causing the search engine to identify files based on the retrieval parameters. The search results can be generated based on the identified files. The retrieval parameters can dictate a modification to be made to the search request to generate a modified search request, and causing the search engine to identify files based on the retrieval parameters can include causing the search engine to identify at least one file of the files based on the at least one file being indexed with one or more components of the modified search request. The modified search request can include at least one term that is not included in the search request, and the at least one file can be identified based on it being indexed with the at least one term. Determining the reward can be further based on a duration of the search session. The duration can be based on a quantity of search requests submitted during the search session. The modified policy can be configured to reduce a delay with which the search result is provided by the search engine during a subsequent search session. The separate search request can include a search term provided in at least one search request received in an initial half of the search session. The action parameters can be configured to modify a file index from which the search results are based.

In other implementations, a method implemented by one or more processors is set forth as including operations such as receiving, at a search interface, a first search request that includes a first search term, and causing a results interface to present a first set of search results that identify one or more data files of a set of data files. The first set of search results can be associated with an action index and the first search request can be associated with a state index. The state index can include value entries such that each value entry of the value entries correspond to one or more search terms. The operations can also include receiving, at the search interface, a second search request that includes a second search term that is different than the first search term, and causing the results interface to present a second set of search results that identifies a resulting data file of the set of data files. The operations can further include receiving a user input corresponding to a selection of the resulting data file, and modifying, in response to receiving the user input, a policy value associated with the first search term. Modifying the policy value can increase a probability of the search interface providing, in response to receiving the first search term in a search request, a search result that identifies the resulting data file.

The operations can optionally include receiving, at the search interface and in a subsequent search request, the first search term, and, in response to receiving the first search term in the subsequent search request, causing the results interface to present a search result corresponding to the resulting data file. Modifying the policy value can further cause an increase in rank of the search result corresponding to the resulting data file. When the first search request is received at the search interface, the first search term can be unidentified by the state index accessible to the one or more processors. Modifying the state index can include incorporating a supplemental entry into the state index, and the supplemental entry can correspond to the first search term. The operations can optionally include accessing a database that includes search terms that are synonymous to the first search term. Modifying the state index can include incorporating, into the state index, one or more entries that identify the search terms. The action index and the state index can be part of a reinforcement learning model that includes a policy index that identifies the modified policy value. Modifying the policy value can decrease a separate probability of the search interface providing, in response to receiving the first search term in the search request, a different data file in the second search results.

In yet other implementations, a method implemented by one or more processors is set forth as including operations such as receiving a series of search requests during a search session, the series of search requests comprising an initial search request and a separate search request, and causing a search interface to provide search results in response to receiving the series of search requests. The operations can further include determining that a cessation event has occurred. The cessation event can be associated with a selection of a search result of the search results, the search result corresponding to the separate search request. The operations can also include comparing an initial term in the initial search request of the series of the search requests to terms in the separate search request of the series of search requests, and modifying an index associated with a data file identified in the search results. Modifying the index can include incorporating, into the index, an entry that provides a correspondence between the initial term in the initial search request and the data file. The operations can also include, when the initial term is provided in a subsequent search request, identifying the entry in the modified index using the initial term, and generating subsequent search results that identify the data file corresponding to the entry in the index. The operations can further include, when the initial term is provided in a subsequent search request, modifying the subsequent search request to incorporate one or more terms from the separate search request. The subsequent search results can be based on the modified subsequent search request. Comparing the initial term to terms in the separate search request can include determining whether the initial term is included with the terms in the separate search request. The operations can also include generating a first value for the initial term in the index, and generating a second weight value for one or more entries corresponding to terms in the separate search request. The first weight value for the initial term can increase a probability that the data file will be provided in the subsequent search results. Furthermore, modifying the index can be performed according to action parameters generated by a reinforcement learning model accessible to the one or more processors. The action parameters can include a weight value corresponding to the initial term in the initial search request.

In yet other implementations, a method implemented by one or more processors is provided and includes receiving a search request, determining a state for the search request, and processing the state utilizing a trained policy of a reinforcement learning model to generate action parameters for one or more search actions to be performed by a search engine in response to the search request. The method further includes causing the search engine to (i) perform the one or more search actions based on the search request and the action parameters and (ii) provide search results based on performance of the one or more search actions based on the search request and the action parameters. The trained policy utilized in the method can be one trained based at least in part on: receiving a plurality of prior search requests during a prior search session; determining a corresponding state for a prior search request of the plurality of prior search requests; processing the corresponding state utilizing a prior policy of the reinforcement learning model to generate corresponding action parameters for the one or more search actions; causing the search engine to (i) perform the one or more search actions based on the prior search request and the corresponding action parameters and (ii) provide prior search results based on performance of the one or more search actions based on the prior search request and the corresponding action parameters; detecting an occurrence of a cessation event that indicates a cessation of the prior search session; determining a reward based on whether the cessation event corresponds to a prior search result, of the prior search results, satisfying the prior search request; and generating the trained policy of the reinforcement learning model by modifying the prior policy of the reinforcement learning model based on the determined reward.

In yet other implementations, a reinforcement learning model stored in one or more non-transitory computer readable media is provided. The reinforcement learning model can include a policy trained based on performing a method including: receiving a plurality of search requests at a search interface during a search session; determining a corresponding state for a search request of the plurality of search requests; processing the corresponding state utilizing the policy of the reinforcement learning model to generate corresponding action parameters for one or more search actions to be performed by a search engine in response to the search request; causing the search engine to (i) perform the one or more search actions based on the search request and the corresponding action parameters and (ii) provide search results based on performance of the one or more search actions based on the search request and the corresponding action parameters; detecting an occurrence of a cessation event that indicates a cessation of the search session; determining a reward based on whether the cessation event corresponds to a search result of the search results satisfying the search request; and training the policy of the reinforcement learning model based on the determined reward.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Reinforcement learning controls an agent while attempting to maximize a reward function. At state $x_t$ in time t, the agent chooses and executes action(s) $u_t$ according to its policy $\pi(u_t|x_t)$ and, after executing one or more actions based on one or more states, receives a reward $r(x_t, u_t)$. The agent then updates its policy based on the reward. The reward is based on the reward function and, more particularly, based on applying observation(s), that are based on the executed action(s), to the reward function. The goal of reinforcement learning is to find the optimal policy $\pi^*$ which maximizes the expected sum of rewards from an initial state distribution. The optimal policy is sought through iterative updating of the policy in accordance with rewards determined based on actions taken in accordance with the policy.

In implementations disclosed herein, each state is based on a submitted search request of a search session, action(s) performed based on a given state include one or more search action(s) that are dictated based on action parameter(s) generated according to the policy, and the reward function seeks to reward search sessions that result in a desired file being identified and/or that seeks to reward search sessions that conclude more quickly. Each reward is determined based on applying observation(s), from a corresponding search session, to the reward function. Accordingly, reinforcement learning techniques disclosed herein seek to learn an optimal policy for determining parameter(s) for performance of search action(s), where the parameter(s) cause a search session to be successful and to conclude quickly. Action parameters for various search actions can be determined based on the policy, such as action parameters that dictate: which ranking signals are utilized in ranking search results, respective weight(s) given to each of multiple ranking signals in ranking search results, and/or how the search engine identifies documents that are responsive to the search request.

Some implementations disclosed herein utilize reinforcement learning to train a policy network that parameterizes a policy for determining parameter(s) for search action(s) based on a current state. The current state can be based at least in part on content of a current search query and the policy network can be a neural network, such as a deep neural network. For example, the policy network can be a neural network that accepts the current state as input and that generates, based on the input and learned policy parameters of the neural network, output that indicates one or more action parameters for one or more search actions. For instance, the output can indicate a corresponding weight for each of multiple ranking signals utilized by a search engine in ranking documents that are responsive to a search query. The search engine can utilize the weights in ranking the documents, and provide search results, that correspond to the documents, for presentation (e.g., audible and/or visual) in response to the search query and for presentation in accordance with the ranking. A search engine can utilize a policy neural network by applying a current state to the policy neural network upon submission of a search query, generating action parameters output by processing the current state using the policy neural network, and performing one or more search actions in accordance with the action parameters indicated by the output. This can occur for each search query of a search session, and the polity neural network can be updated, in accordance with a reward function, at the conclusion of a search session (as indicated by a cessation event).

Figure 1:
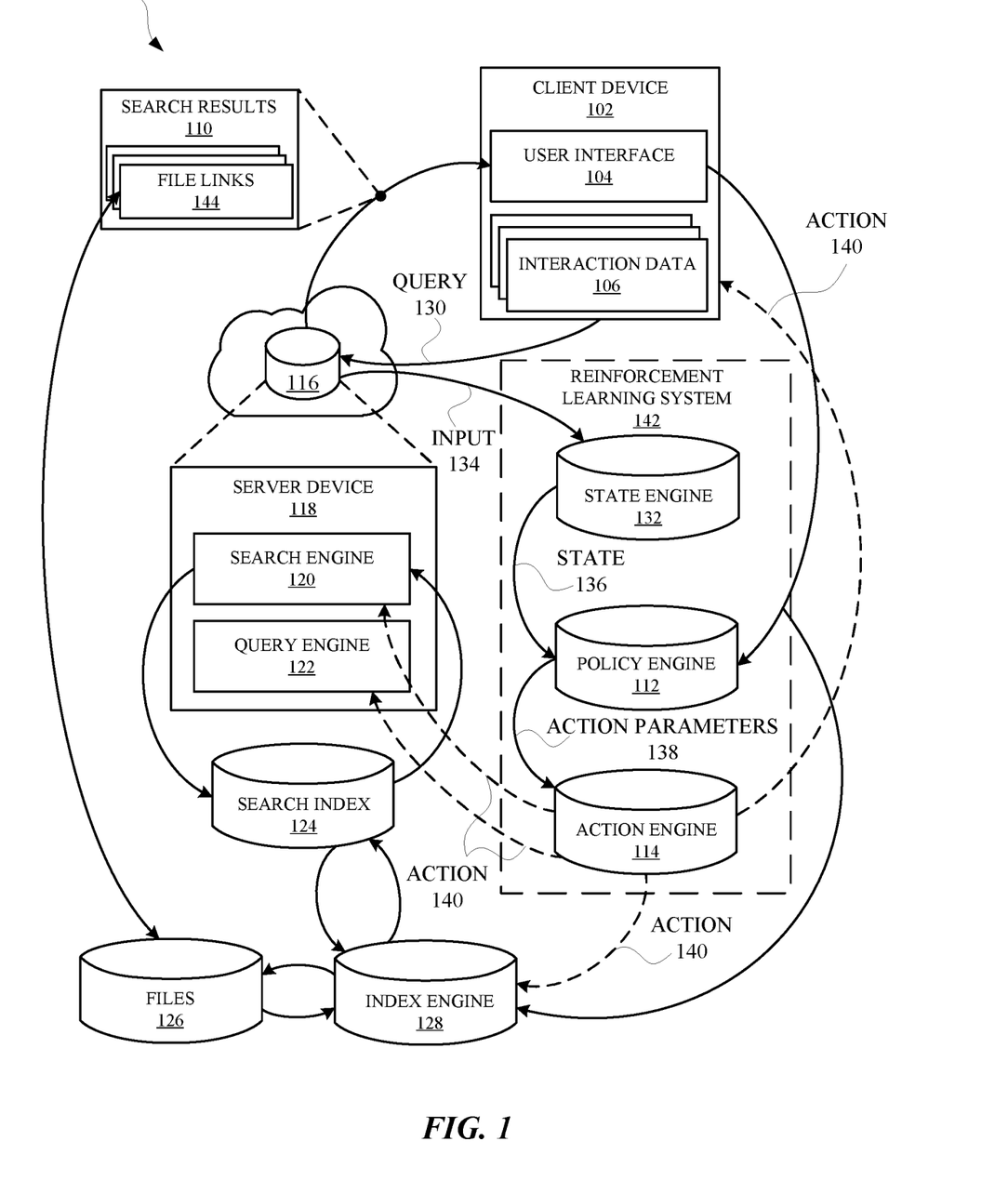
FIG. 1 illustrates a system for providing search results that are adapted for a user according to previous search queries submitted by the user.

FIG. 1 illustrates a system 100 for providing search results 110 that are adapted for a user according to previous search queries submitted by the user. The system 100 can include a client device 102, which can provide a user interface 104 for interacting with a search application accessible to the client device 102. The client device 102 can be a computing device such as a cell phone, tablet computer, internet of things (IoT) device, home assistant device, vehicle computing device, and/or any other computing device capable of accessing a network. The user interface 104 can be provided as part of an application that enables searching for files located at the client device 102, a remote computing device 116, and/or any other device that can store or access files. For example, the user interface 104 can be provided by a browser application that allows a user to search a network such as the Internet. The user interface 104 can accept search queries provided via one or more input modalities such as typed and/or spoken search queries. For example, a user can interact with a visible field of the user interface 104 to type a search query and/or can speak a search query (optionally after selecting a "voice search" interface element and/or speaking a "hot word"). As the user performs searches, receives search results, and interacts with the search results, the client device 102 can generate interaction data 106—and/or the search engine 120 can generate the interaction data 106 based on observed interactions that occur via the client device 102. The interaction data 106 can be indicative of an amount of attention or interest that a user is giving to one or more search results. The interaction data 106 can identify search results 110 and/or file links 144 that have been generated in response to a search query 130. Furthermore, the interaction data 106 can provide metrics that identify whether a user disregarded one or more file links 144 (e.g., scrolled past links to particular files 126) and/or interacted with the one or more file links 144 (e.g., hovered over a link and/or selected a link).

A search engine 120, which can be hosted at a remote computing device 116 (e.g., a server device 118), can receive the search query 130 and provide search results 110 in response to receiving the search query 130. The search engine 120 can provide search results 110 by receiving the search query 130 and comparing terms in the search query 130 to terms provided in a search index 124 that is accessible to the search query 130. The search index 124 can be generated by an index engine 128 that processes files 126 located at one or more computing devices connected over a network (e.g., the Internet). The index engine 128 can generate and/or identify terms to be included in the search index 124 based on the content of the files 126. For example, the files 126 can include web pages that are accessible to a browser application, and the index engine 128 can generate the index based on content provided in the web pages. The content can include text, images, videos, code, and/or any other content that can be included in a web page.

In order to identify a desired file 126 in a search result 110, a user may have to submit multiple queries 130 into the user interface 104 in order that various arrangements of search results 110 can be provided to the user. In order to reduce a number of search iterations that must be undertaken by the search engine 120, the system 100 can include a reinforcement learning system 142. The reinforcement learning system 142 can be provided at one or more of the server device 118, client device 102, and/or any other device capable of processing search requests utilizing machine learning models. For instance, the reinforcement learning system 142 can be accessible to the remote computing device 116.

The reinforcement learning system 142 can include a state engine 132, a policy engine 112, and/or an action engine 114. The state engine 132 can identify one or more states associated with a search session in which a user is participating. The state engine 132 can generate a state 136 using an input 134 from the remote computing device 116, the client device 102, and/or any other device or application that can be associated with a search session. For example, the state engine 132 can generate each state 136 based on a most recently submitted search query of a search session, and optionally based on one or more preceding search queries of the search session. For instance, the state can be an embedding generated based on the search query, such as an embedding of terms of the search query. A search session can begin with an initial search request that includes one or more terms (and/or other content) included in a search query 130. When the user does not identify a desired file from the initial search results 110, the user can submit subsequent search queries during the search session. The search session can end when a cessation event has been detected by the reinforcement learning system 142, the remote computing device 116, and/or the client device 102.

The state engine 132 can provide data to, and/or exchange data with, the policy engine 112, where the data corresponds to one or more states 136 (e.g., a state based on a current search query of a search session). The policy engine 112 processes the state utilizing its current policy (e.g., based on current trained weights, of a machine learning model, that define the policy), and generates one or more action parameters 138 based on processing of the state utilizing the current policy. The policy can be trained as described herein to cause action parameters 138 to be generated, such that the generated action parameters seek to maximize a reward (of the currently trained policy) in view of a given state 136. More specifically, in some implementations, the policy can seek to maximize a reward that seeks to reduce (i) a number of search iterations and/or (ii) reduce a search session duration in order that a user can more quickly find a search result. Therefore, the policy engine 112 can generate action parameters 138 corresponding to one or more different actions to be performed by one or more devices and/or applications of the system 100.

In some implementations, the action parameters 138 generated by the policy engine 112 can correspond one or more actions for modifying a search query 130. For example, the actions can correspond to one or more actions for adding content to a search query 130, such as adding one or more terms to the search query 130. The policy engine 112 can communicate various actions 140 to different portions of the system 100 according to various implementations. For example, in some implementations, the policy engine 112 can generate action parameters 138 to cause a search query 130 to be modified by a query engine 122 in accordance with the action parameters—thereby causing more suitable search results 110 to be provided to a user. For instance, terms can be added or removed from a search query 130 according the action parameters 138 that were generated by the policy engine 112 based on the state 136. For example, a user can provide a search query 130 with the search terms "letter," "from," and "Carlos," with the hopes of finding a web page corresponding to a blog post associated with a "letter from Carlos." The search query 130 can be used as a basis for an input 134 to the state engine 132, which can infer a state 136 of a current search session from the search query 130. The policy engine 112 can process the provided state 136 using its current policy in order to generate action parameters 138 that will facilitate a modification to the search query 130. The action parameters 138 can indicate, directly or indirectly, one or more supplemental search terms to append to the search query, such as the supplemental search term "blog." The policy can dictate the addition of the supplemental terms, given the state 136, based on, for example, being trained in view of one or more previous search sessions where the policy based action of adding "blog" (or similar term) to a search query, for a similar state, resulted in a positive reward.

As another example, the action parameters can additionally and/or alternatively dictate which ranking signals are to be utilized in ranking documents determined to be responsive to a search query and/or can dictate a corresponding weight for each of multiple ranking signals to be utilized. For instance, the action parameters can dictate a corresponding weight for each of fifteen different ranking signals. The action parameters generated utilizing the policy will vary for various search queries, as the states determined based on such various search queries will vary, and the action parameters are generated based on a current state and the current policy. For instance, for a first search query a first set of fifteen weights will be determined, whereas a distinct second set of fifteen weights will be determined for a second search query that varies from the first search query. Again, the weights determined will be dictated by the state and the policy. Since the reinforcement learning model is iteratively updated based on a reward that seeks to achieve short and successful search sessions, the policy will be trained to enable prediction of weights that are likely to achieve a short and successful search session given a current state. More particularly, explorations of the policy occur during prior training and "good" explorations of the policy are rewarded through positive rewards (i.e., when the explored policy resulted in a successful and short search session), while "bad" explorations of the policy are penalized through less positive rewards (i.e., when the explored policy resulted in an unsuccessful and/or long search session).

Optionally, in some implementations, the action engine 114 can cause actions 140 of re-weighting index entries and/or modifications to index entries to be performed at the index engine 128 and/or the search engine 120. The re-weighting of index entries can be performed according to a policy of the policy engine 112, which can generate action parameters 138 based on the state 136 provided to the state engine 132. For example, a user can be using the search engine 120 to identify an image that is stored in the files 126 with other files 126, such as other images. Each of the images in the files 126 can be identified in an index generated by the index engine 128 and accessible to the search engine 120. Furthermore, the index can initially include terms that are associated with objects in the images.

For example, the images can include images associated with objects in interstellar space, and the terms associated with the images can include "star," "galaxy," "black hole," "supernova," and "nebula." The desired file can be one that is associated with the term "galaxy," however, in an initial search query 130, the user can include simply the term "centaurus," which can refer to a galaxy named Centaurus A. Because the index does not include the term centaurus, the search engine 120 can provide a list of search results 110 that may not include file links 144 to the desired image corresponding to the term centaurus.

During the search session, the user can identify the desired image in a search result 110, and select a file link 144 that corresponds to the image of the galaxy named Centaurus A. The final search query 130 can include the term "galaxy," which can be identified in the index but not weighted high relative to the Centaurus A image. Because the user selected the file link 112 corresponding to the desired image, the reinforcement learning system 142 can determine that a cessation event has occurred. The selection of the file link 144 can correspond to a positive reward that causes the reinforcement learning system 142 to update a policy of the policy engine 112 used in generating action parameters 138. The action parameters 138 can correspond to an action for the action engine 114 to cause the index engine 128 to re-weight one or more terms in the index that identifies the desired file. For example, the action parameters correspond to an action 140 for including the term "galaxy" in the index in correspondence with the Centaurus A image and weighting the term "galaxy" higher than a weight of one or more other terms that are associated with the Centaurus A image. Furthermore, the term provided in the initial search query 130 (e.g., "centaurus") can also be added to the index in correspondence with the Centaurus A image and weighted higher than one or more other terms associated with the Centaurus A image. In this way, the next time the user provides their initial search query 130, the Centaurus A image will be ranked, at least according to weight, higher than other files identified in the search results 110 provided in response.

Optionally, in some implementations, the policy engine 112 can operate to provide action parameters 138 corresponding to one or more actions that cause search term suggestions to appear when the user is providing a search query 130 to the user interface 104. For example, the action parameters 138 can correspond to actions 140 that can cause a suggestion to be presented at the client device 102. An action 140 for providing a suggestion can include displaying a term when the user inputs a search query 130 corresponding to a state 136. As discussed with respect to the Centaurus A image example, the user can provide a search query 130 that includes the search term "centaurus." However, because the policy had since been updated to generate action parameters for handling the state 136 of having "centaurus" as a search term, the action parameters 138 generated can be associated with a suggested search term. Specifically, because the user previously ended up using the search term "galaxy" to identify the desired file (e.g., the Centaurus A image), an action provided by the action engine 114 can cause a graphic to appear with a selectable suggestion. The selectable suggestion can include the phrase, "Select to include the term 'galaxy.'" When the user selects the selectable suggestion, the search terms in the search query 130 can be modified prior to the search engine 120 receiving the search query 130. In this way, the desired file will appear in the search results 110 without having the user to repeat all the search term iterations from their previous search session.

This can preserve computational resources and power for both the remote computing device 116 and the client device 102.

In yet other implementations, a policy of the policy engine 112 can provide action parameters 138 that correspond to actions 138 for determining an image preview and/or video preview that will be provided in response to a particular search query 130 (e.g., a state 136). For example, the files 126 can include various videos that include family members of the user, however, the videos may also include other objects such as trees, ocean, houses, food, and/or any other objects that can be included in a family video. Initially, the search index 124 can include terms for each video but the terms may not include identifiers for family members in the video. Therefore, as the policy is updated with each search query 130, terms corresponding to the family members in the videos can be incorporated into the search index 124. Furthermore, terms incorporated into the index can be associated with a time, time period, and/or one or more times in one or more videos where the term is relevant. In this way, as the user searches for particular files 126, the search results 110 that are displayed can include image and/or video previews that change dynamically. This can improve a probability that a user will identify content in one or more videos that are relevant to the search terms in the search queries 130 being provided by the user. The incorporation of additional time dependent terms can be performed according any of the implementations discussed herein for reducing a number of search iterations in order for a user to more quickly identify a desired file.

Figure 2:
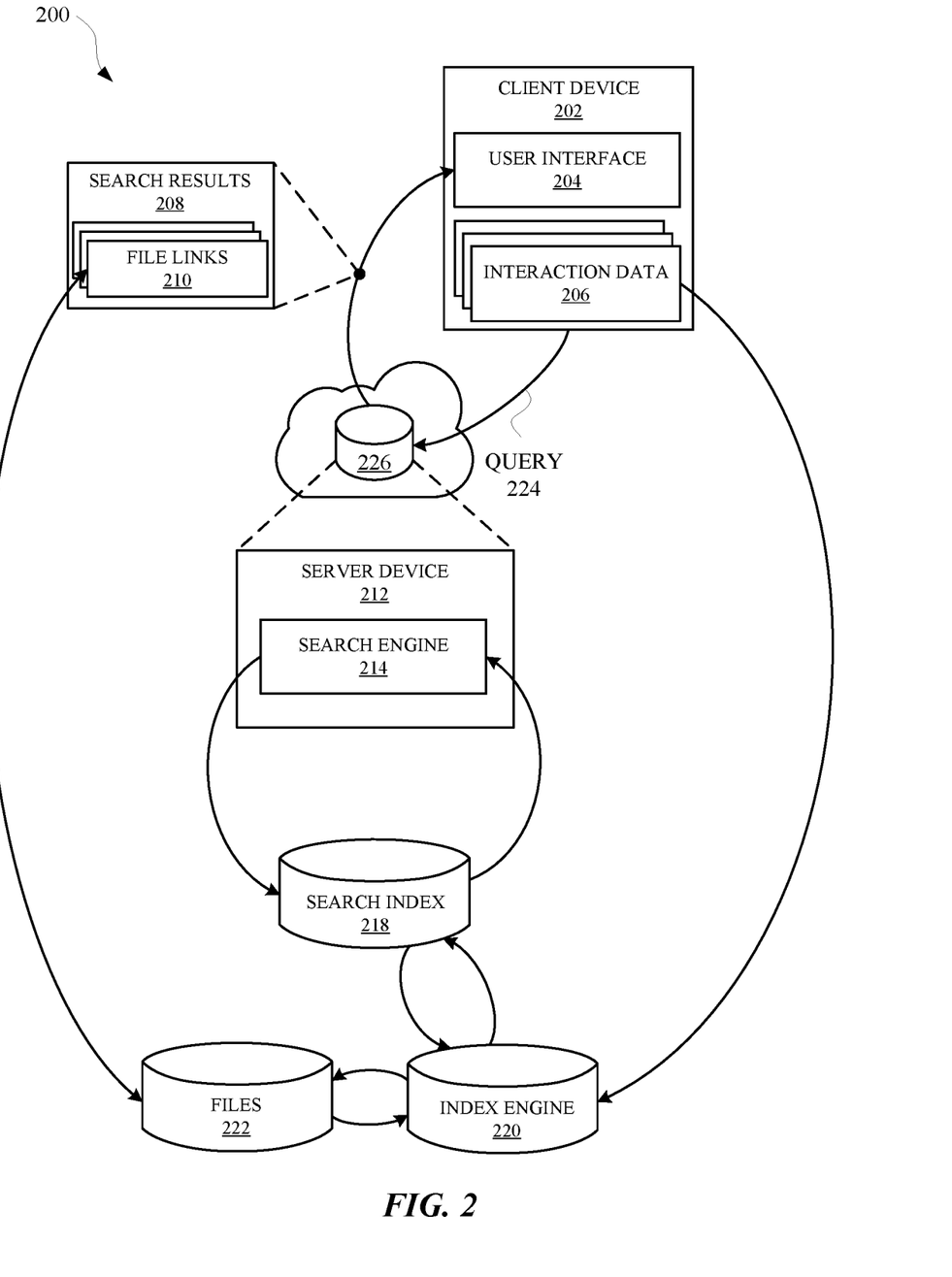
FIG. 2 includes a system that is capable of updating a search index according to terms provided in search queries during a search session.

FIG. 2 includes a system 200 that is capable of updating a search index 218 according to terms provided in search queries 224 during a search session. The system 200 can operate using a client device 202 that is capable of accessing a remote computing device 226 over a network, such as the internet. The client device 202 can also access one or more applications that include a search function for finding files 222 that are accessible to the remote computing device 226. The remote computing device 226 can be a server device 212 that includes a search engine 214 for searching a search index 218 to identify files 222 identified in the search index 218. Specifically, a user can view one or more search results 208 in response to submitting a search query 224, and the search results 208 can include file links 210, which can be selectable elements that cause a corresponding file to be provided at the client device 202.

In order to reduce a time for each search session and/or reduce a number of search queries 224 that a user submits before identifying a desired file, the system 200 can operate to adapt the search index 218 according to terms submitted in each search query 224. For example, a user can search for a web page that describes a historical event, such as a famous battle. Initially, the user can provide an initial search query 224 that includes the terms "famous" and "battle." In response, search results 208 can be provided with file links 210 that may not correspond to the web page that the user intended to find. Interaction data 206 can be provided to an index engine 220 as the user scrolls through search results, selects a file link 210, and/or otherwise does or does not direct some amount of attention to a file link 210.

In some implementations, the interaction data 206 can indicate that the user has selected a file link 210 from a search result 208. Furthermore, the interaction data 206 can identify an initial search query 224 that was provided during a search session and a final search query 224 that was provided during a search session. Because the final search query 224 resulted in the user identifying the desired file (e.g., a particular webpage about a famous battle), the search index 218 can include a term that is part of an entry that provides a correspondence between the final search query 224 and the desired file. In order to provide the desired file sooner during a subsequent search session, the index engine 220 can compare the terms in the search index 218 with the terms in the initial search query 224. When the search index 218 does not include a term provided in the initial search query 224, the index engine 220 can update the search index 218 to include one or terms that were included in the initial search query 224. In other words, the index engine 220 can update the index to include entries that provide a correspondence between the initial search query 224 terms and the desired file. In this way, the desired file will have a higher probability of appearing in search results 208 earlier in a search session that begins with or includes a search query 224 with the previously provided initial search query 224 terms. In some implementations, the terms that are added can be dynamically weighted according to the interaction data 206 as the user continues to perform search sessions where the user either selects or disregards particular file links 210.

Figure 3:
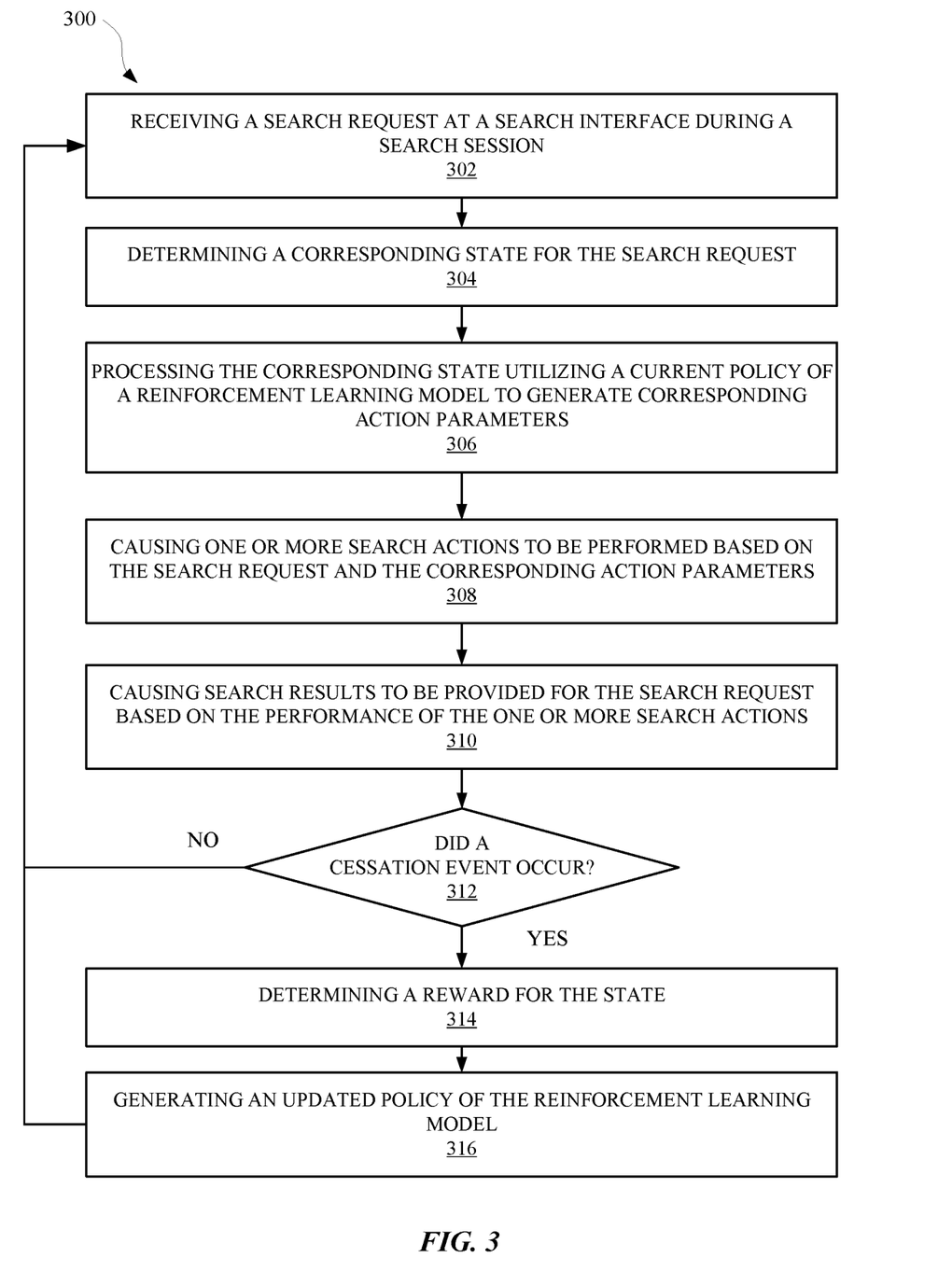
FIG. 3 illustrates a method for updating a policy of a reinforcement learning model in order to minimize a number of search requests that would be provided to a search engine before a user identifies a desired search result.

FIG. 3 illustrates a method 300 for updating a policy of a reinforcement learning model in order to minimize a number of search requests that would be provided to a search engine before a user identifies a desired search result. The method 300 can be performed by one or more computing devices that are capable of receiving and/or processing search requests.

The method 300 can include an operation 302 of receiving a search request at a search interface during a search session. A search request can be embodied as an input (e.g., a textual input, spoken input, gesture, and/or any other type of computer input) to an application such as an internet browser, file browser, media application, and/or any other application capable of employing a search function. The search interface can correspond to a user interface that allows a user to interact with the search application (i.e., search engine) through an audio, visual, audio-visual, and/or any other interface for allowing a user to interact with an application. For example, the search interface can correspond to a search field of a graphical user interface of a music streaming application. A user can initialize a search session at the music streaming application by providing search terms into a search field of the music streaming application and indicating that the search terms be submitted as a search request.

The method 300 can further include an operation 304 of determining a corresponding state for the search request. The state can refer to the contents of the search request and/or a context of the search request. For example, the search request can include the terms "morning" and "playlist." Additionally, or alternatively, the search request can identify a context of the search request, such as a time of day (e.g., a time stamp), a current music stream being played, a previous music stream selected, other application(s) the user is interacting with, a location of the user, and/or any other data that can describe a context of the search request and/or the user. In some implementations, the search terms and/or the contextual data can be converted into vector space data, multidimensional data, and/or any other data format from which a state can be inferred. In this way, the reinforcement learning model can process the states of the search session in a format that is uniform for each search request that is submitted by the user.

The method 300 can further include an operation 306 of processing the corresponding state utilizing a current policy of the reinforcement learning model to generate corresponding action parameters. The current policy can be, for example, encoded by the architecture and weights of a neural network model or other machine learning model, where those weights have been trained through prior iterations of reinforcement learning as described herein. The action parameters can be generated by applying the state as input to the machine learning model, and generating output based on processing the state using the current trained weights of the model. The output indicates (directly or indirectly) the action parameters. The reinforcement learning model can be trained in view of multiple iterations of a reward, where the reward at each iteration is determined in view of a reward function that seeks to minimize an amount of processing necessary to identify a desired file during a search session.

Various action parameters can be generated at action 306, and the generated action parameters will dictate performance of one or more search actions. The search actions can include one or more actions performed by a search engine such as, for example, identification of file(s) that are responsive to a search (e.g., using a search engine index) and/or ranking of search result(s) that correspond to the responsive file(s). For example, the action parameters can dictate how the search engine ranks search results that are identified as responsive to the search request. Also, for example, the action parameters can additionally or alternatively dictate how the search engine identifies documents that are responsive to the search request.

The method 300 can additionally include an operation 308 of causing one or more search actions to be performed based on the search request and the corresponding action parameters. For example, the action parameters can dictate which ranking signals are utilized in ranking search results and/or the respective weight(s) given to each of multiple ranking signals—and operation 308 can include causing search results to be ranked in accordance with such action parameters. Also, for example, the action parameters can additionally or alternatively dictate how responsive documents are identified such as by causing identification of one or more additional and/or alternative term(s) to utilize in searching an index to identify responsive documents (e.g., effectively "modifying" the search query)—and operation 308 can include causing identification of document(s) that are responsive to a search request to be performed in accordance with such action parameters. This can cause one or more document(s) to be identified, as responsive to the search query, that would otherwise not have been identified as responsive (i.e., would not have been identified as responsive had the action parameters not been dictated).

The method 300 can also include an operation 310 of causing search results to be provided for the search request based on the performance of the one or more search actions. This can include causing search results to be rendered (e.g., audibly and/or graphically) at a computing device that submitted the search query, where the search results each correspond to a corresponding document or other content item identified as responsive to the search request. For example, the search results can be transmitted to the computing device by the search engine and rendered by the computing device in response to being received at the computing device. Which search results are provided and/or the manner in which they are provided can be based on the search action(s) performed at operation 308 based on the action parameter(s). For example, search result(s) can be provided based on search result document(s) identified in accordance with action parameter(s) and/or search results can be provided in an order and/or with other presentation prominence(s), based on rankings of those search results in accordance with action parameter(s).

At operation 312 of method 300, a determination is made whether a cessation event has occurred. A cessation event can refer to a positive or negative event corresponding to an interaction between a user and the search results. For example, a positive cessation event can refer to a user stopping scrolling through search results in order to look in more detail at a specific search result. A positive cessation event can additionally or alternatively refer to a user selecting a particular search result, hovering a cursor over a search result, providing an audio or visual gesture that identifies the search result, and/or any other activity that can indicate at least a threshold degree of interest in a search result. A negative cessation event can refer to, for example, stopping a search session without a positive cessation event being detected. For example, a negative cessation event can be detected when one or more searches are issued in a search session, and no positive cessation event is detected within the search session or within at least a threshold period of time of the most recently submitted search of the search session.

When a cessation event does not occur, the method 300 can proceed back to operation 302 where another search request is received at the interface during the search session. When a cessation event does occur, the method 300 can proceed to operation 314 of determining a reward. The reward is determined based on a reward function, and can be based on whether the cessation event was a positive cessation event or a negative cessation event. When the cessation event is a positive cessation event, the reward can be a positive reward for the current state, and when the cessation event is a negative event, the cessation event can be a negative reward (or a "less positive" reward). In this way, positive rewards will cause the current policy to be updated to create action parameters that will help to reduce a number of states that will be cycled through before the user identifies a desired search result. In some implementations, the reward for a positive cessation event can further be based on a duration of the search session. For example, the reward function can discount the reward as a function of the duration (i.e., with increasing discount as duration increases). Various indications of duration of a search session can be utilized, such as a quantity of search queries submitted in a search session, total time of the search session, a quantity of search results selected without being rendered or opened for a threshold amount of time, and/or other indication(s).

The method 300 can then proceed to operation 316, where a policy of the reinforcement learning model is updated. For example, where the policy is represented by learned weights of a neural network model, the policy can be updated by back propagation of the calculated reward to thereby update on or more of the learned weights of the neural network model. Through multiple iterations of the method 300, the policy is continuously updated and through updating, in view of the reward function, the policy is adapted to generate action parameters that will influence search actions in a manner to cause search sessions to be concluded successfully and quickly. In this way, a user will spend less time providing search queries to the search application, and less computational resources will be expended on processing the search queries.

Figure 4:
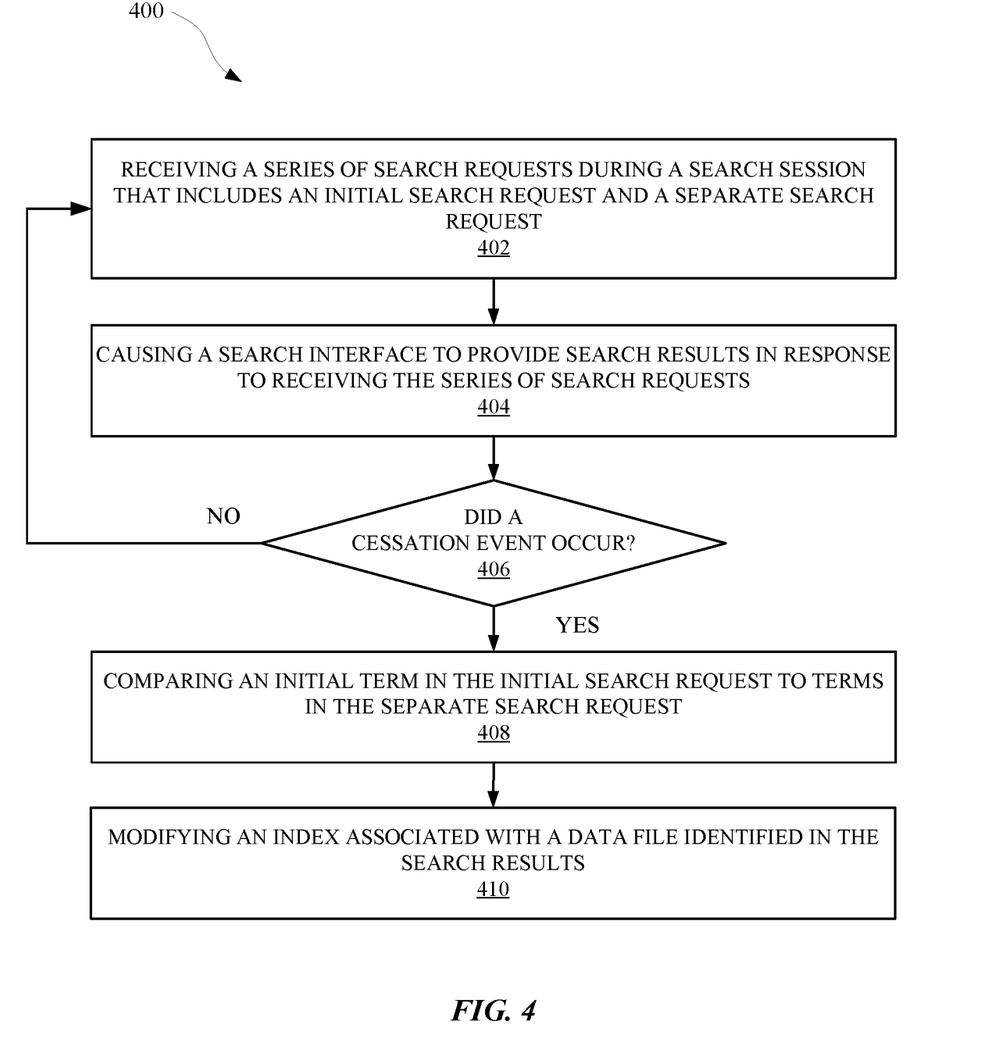
FIG. 4 illustrates a method for modifying an index according to search terms provided in an initial search query provided by a user during a search session.

FIG. 4 illustrates a method 400 for modifying an index according to search terms provided in an initial search query provided by a user during a search session. The method 400 can be performed by one or more computing devices capable of storing and/or causing modifications to a search index. The method 400 can include an operation 402 of receiving a series of search requests during a search session that includes an initial search request and a separate search request. The search requests can be provided to a cloud storage application that stores a variety of files, including images, documents, videos, and/or other file type that can be stored at a remote server device (i.e., a cloud server). For example, a user can be searching for a particular video that includes certain individuals and the user can provides the initial search query with the search terms "family reunion video." An index associated with the files can include terms corresponding to the video, such as a stored title of the video and/or any other descriptors stored with the video. However, the index may not include any terms that would allow the user to distinguish the content of the video from other videos managed by the cloud storage application. Therefore, if the user does not know the title or any other term by which the video is indexed, computational resources can be wasted trying to find the video.

The method 400 can further include an operation 404 of causing a search interface to provide search results in response to receiving the series of search requests. Specifically, the search results can include a list of identifiers for files managed and/or stored by the cloud storage application. The list can include a limited number of identifiers, and therefore may or may not include the video for which the user is searching. Therefore, the user may have to scroll through the results in order to cause other results to appear, select a next page of results, and/or perform some other action to cause more search results to appear. Furthermore, the search results can include icons that provide a preview of a file in order for the user to more readily identify a file from a corresponding icon. For instance, when the cloud storage application is managing video files, the icons can include still images and/or animated images that provide a preview of the video.

At operation 406 of method 400, a determination is made regarding whether a cessation event has occurred. A cessation event can refer to any of the cessation events described herein. In some implementations, the cessation event can refer to a user selecting a file managed by the cloud storage application, hovering over a file managed by the cloud storage application, and/or performing any other action indicating that the user is interested in the file. When a cessation event has not occurred, the method 400 can proceed to operation 402 where additional search requests are received. However, when a cessation has occurred, the method 400 can proceed to operation 408 of comparing an initial term in the initial search request to terms in the separate search request. At operation 408, the initial term can be compared to the terms in the separate search request in order to identify a difference between the initial term and the terms in the separate search request. For example, the initial search request can include the terms "family," "reunion," and "video," and the separate search request can include the terms "family," "video," "spring," thereby indicating that the term "reunion" was not included in the initial search request.

The method 400 can further include an operation 410 of modifying an index associated with a data file that is identified in the search results corresponding to the cessation event. For instance, the data file can be a family reunion video hosted by the cloud storage application, and the index can be updated in order that the family reunion video will have a higher probability of appearing in search results that include the initial term. For instance, the index associated with the cloud storage application can be modified to include the term "reunion," which can be stored in correspondence to the data file (e.g., the family reunion video). In this way, the next time the user provides a search request that includes the term "reunion," the family reunion video can be identified in a search result that is ranked higher than when the user provided the initial search request at operation 402. In this way, computational resources and power can be preserved by the cloud storage application not having to process inconsequential search requests and not displaying search results that are not interesting to the user.

Figure 5:
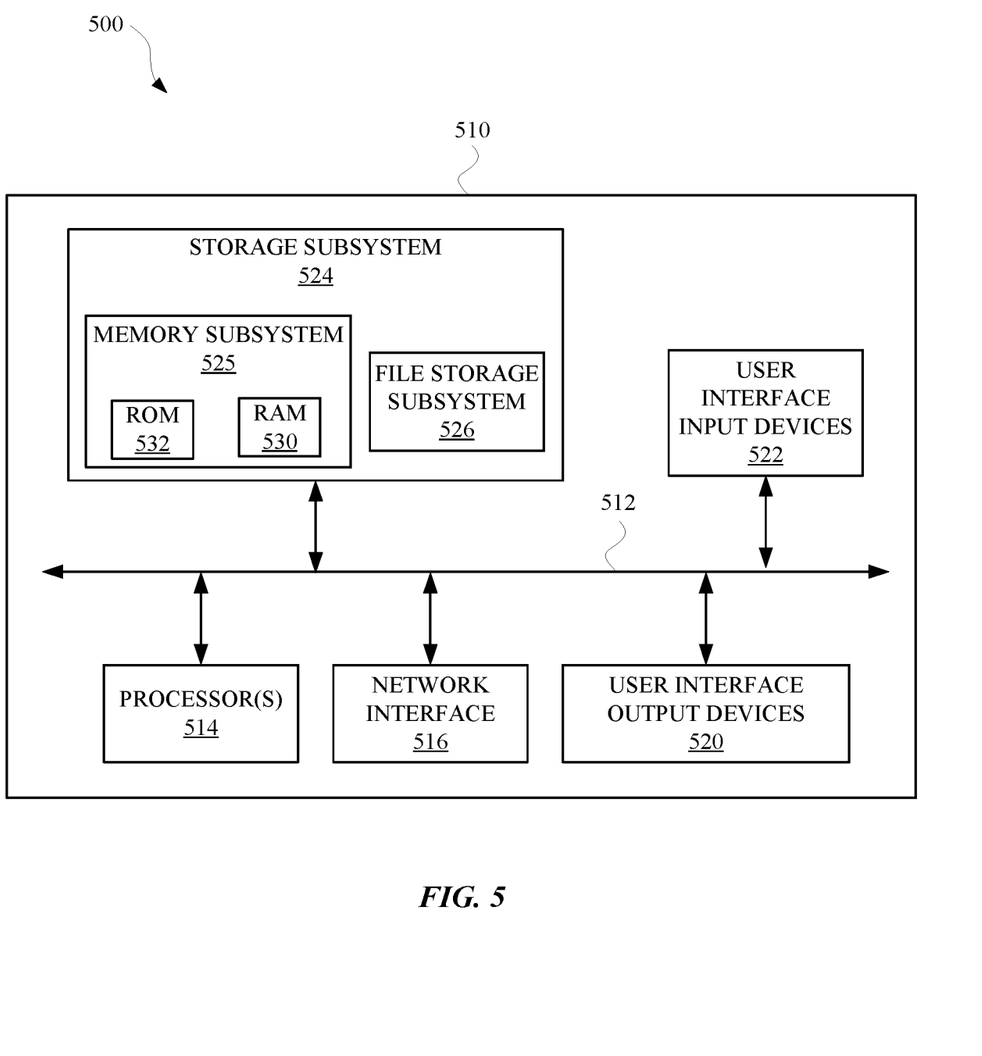
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, method 400, and/or to implement one or more of the client device 102, the client device 202, the server device 118, the server device 212, the reinforcement learning system 142, and/or any other element or device discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:

receiving a plurality of search requests at a search interface during a search session;

determining a corresponding state for a search request of the plurality of search requests;
processing the corresponding state utilizing a current policy of a reinforcement learning model to generate corresponding action parameters for one or more search actions to be performed by a search engine in response to the search request;
causing the search engine to (i) perform the one or more search actions based on the search request and the corresponding action parameters and (ii) provide search results based on performance of the one or more search actions based on the search request and the corresponding action parameters;
detecting, based on corresponding content, of a search result of the one or more search results, being rendered for at least a threshold amount of time, an occurrence of a cessation event that indicates a cessation of the search session;
determining a reward based on (i) the occurrence of the cessation event and based on (ii) a number of times during the search session, before the occurrence of the cessation event, that a user selected one or more other search results of the search results and then accessed corresponding content of the one or more other search results for less than a threshold amount of time;
based on detecting the occurrence of the cessation event and determining the reward, generating a modified policy of the reinforcement learning model by modifying the current policy of the reinforcement learning model based on the determined reward; and
subsequent to the occurrence of the cessation event and generating the modified policy:
receiving a separate search request,
determining a particular state for the separate search request,
processing the particular state utilizing the modified policy to generate other action parameters for the one or more search actions, and
causing the search engine to (i) perform the one or more search actions based on the other action parameters and the separate search request and (ii) provide separate search results based on performance of the one or more search actions based on the separate search request and the other action parameters.

2. The method of claim 1,
wherein the corresponding action parameters include one or more ranking parameters that dictate how search results are to be ranked,
wherein causing the search engine to perform the one or more search actions based on the search request and the corresponding action parameters comprises causing the search engine to rank the search results based on the corresponding action parameters, and
wherein the search results are provided based on the rank of the search results.

3. The method of claim 1,
wherein the corresponding action parameters include one or more retrieval parameters that dictate how files are to be identified as responsive to the search request,
wherein causing the search engine to perform the one or more search actions based on the search request and the corresponding action parameters comprises causing the search engine to identify files based on the retrieval parameters, and
wherein the search results are generated based on the identified files.

4. The method of claim 3,
wherein the retrieval parameters dictate a modification to be made to the search request to generate a modified search request, and
wherein causing the search engine to identify files based on the retrieval parameters comprises causing the search engine to identify at least one file of the files based on the at least one file being indexed with one or more components of the modified search request.

5. The method of claim 4,
wherein the modified search request includes at least one term that is not included in the search request, and
wherein the at least one file is identified based on it being indexed with the at least one term.

6. The method of claim 1, wherein determining the reward is further based on a number of states exhibited during the search session.

7. The method of claim 1, wherein the action parameters are configured to modify a file index from which the search results are based.

8. A method implemented by one or more processors, the method comprising:
receiving, at a search interface, a first search request that includes a first search term;
causing a results interface to present a first set of search results that identify one or more data files of a set of data files,
wherein the first set of search results is associated with an action index and the first search request is associated with a state index, the state index comprising value entries such that each value entry of the value entries corresponds to one or more search terms;
receiving, at the search interface, a second search request that excludes the first search term and that includes a second search term that is different than the first search term;
causing the results interface to present a second set of search results that identifies a resulting data file of the set of data files;
receiving a user input corresponding to a selection of the resulting data file that is presented in response to receiving the second search request including the second search term; and
modifying, in response to receiving the user input, a policy value associated with the first search term,
wherein modifying the policy value comprises modifying an index entry, for the resulting data file, to include the first search term,
wherein prior to the modifying, the first search term was unidentified by the index entry, and
wherein modifying the index entry increases a probability of the search interface providing, in response to receiving the first search term in a search request, a search result that identifies the resulting data file.

9. The method of claim 8, further comprising:
receiving, at the search interface and in a subsequent search request, the first search term; and
in response to receiving the first search term in the subsequent search request, causing the results interface to present a search result corresponding to the resulting data file.

10. The method of claim 8, wherein modifying the policy value further causes an increase in rank of the search result corresponding to the resulting data file.

11. The method of claim 8, wherein, when the first search request is received at the search interface, the first search term is unidentified by the state index accessible to the one or more processors.

12. The method of claim 11, wherein modifying the state index includes incorporating a supplemental entry into the state index, the supplemental entry corresponding to the first search term.

13. The method of claim 12, further comprising:
accessing a database that includes search terms that are synonymous to the first search term,
wherein modifying the state index includes incorporating, into the state index, one or more entries that identify the search terms.

14. The method of claim 8, wherein the action index and the state index are part of a reinforcement learning model that includes a policy index that identifies the modified policy value.

15. The method of claim 8, wherein modifying the policy value decreases a separate probability of the search interface providing, in response to receiving the first search term in the search request, a different data file in the second search results.

16. A method implemented by one or more processors, the method comprising:
receiving a search request;
determining a state for the search request;
processing the state utilizing a trained policy of a reinforcement learning model to generate action parameters for one or more search actions to be performed by a search engine in response to the search request; and
causing the search engine to (i) perform the one or more search actions based on the search request and the action parameters and (ii) provide search results based on performance of the one or more search actions based on the search request and the action parameters;
wherein the trained policy is trained based at least in part on:
receiving a plurality of prior search requests during a prior search session;
determining a corresponding state for a prior search request of the plurality of prior search requests;
processing the corresponding state utilizing a prior policy of the reinforcement learning model to generate corresponding action parameters for the one or more search actions;
causing the search engine to (i) perform the one or more search actions based on the prior search request and the corresponding action parameters and (ii) provide prior search results based on performance of the one or more search actions based on the prior search request and the corresponding action parameters;
detecting, based on corresponding content, of a search result of the one or more search results, being rendered for at least a threshold amount of time, an occurrence of a cessation event that indicates a cessation of the prior search session;
determining a reward based on (i) the occurrence of the cessation event and based on (ii) a number of times during the search session, before the occurrence of the cessation event, that a user selected one or more other search results of the prior search results and then accessed corresponding content of the one or more other search results of the prior search results for less than a threshold amount of time;
based on detecting the occurrence of the cessation event and determining the reward, generating the trained policy of the reinforcement learning model by modifying the prior policy of the reinforcement learning model based on the determined reward.

17. The method of claim 1, wherein detecting the occurrence of the cessation event includes:
determining a passage of a threshold amount of time since a most recent search request, of the plurality of search requests, was submitted without a new search request being submitted.

18. The method of claim 1, wherein a corresponding state for each corresponding search request is based on terms of the search request.

19. The method of claim 1,
wherein the separate search request is received during a subsequent search session, and
wherein modifying the current policy of the reinforcement learning model causes a total number of states exhibited during the subsequent search session to be less than a previous total number of states exhibited during the search session.

* * * * *